(No Model.)

H. TAUSZKY.
APPARATUS FOR SEPARATING AND ASSORTING YEAST.

No. 587,619. Patented Aug. 3, 1897.

WITNESSES:
Chas. E. Preusgerd.
William Miller

INVENTOR
Henry Tauszky.
BY
Hauff & Hauff
ATTORNEYS.

UNITED STATES PATENT OFFICE.

HENRY TAUSZKY, OF NEW YORK, N. Y.

APPARATUS FOR SEPARATING AND ASSORTING YEAST.

SPECIFICATION forming part of Letters Patent No. 587,619, dated August 3, 1897.

Application filed February 10, 1897. Serial No. 622,843. (No model.)

*To all whom it may concern:*

Be it known that I, HENRY TAUSZKY, a citizen of the United States, residing at New York, in the county and State of New York, have invented new and useful Improvements in Apparatus for Separating and Assorting Yeast, of which the following is a specification.

By means of this apparatus yeast can be quickly and effectively separated and assorted, and the yield of yeast is also increased over that obtained by apparatuses heretofore used; and the invention resides in the novel features of construction set forth in the following specification and claims and illustrated in the annexed drawings, in which—

Figure 1:
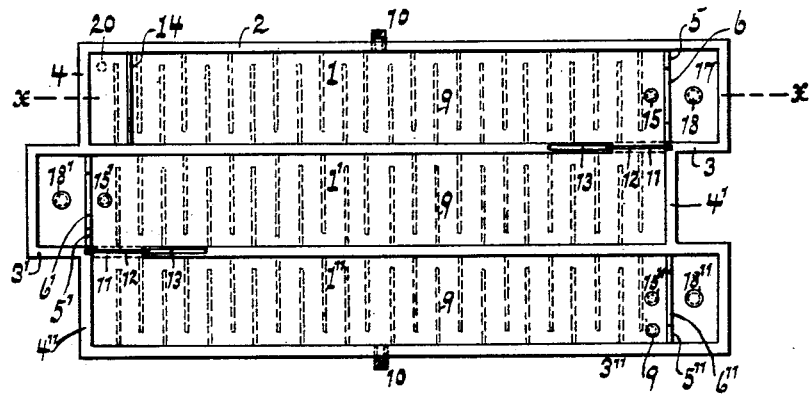
Figure 2:
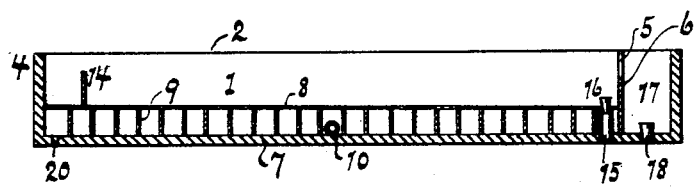

Figure 1 is a plan view of an apparatus for separating and assorting yeast. Fig. 2 is a section along x x, Fig. 1.

A trough 1 has its sides shown at 2 and 3 and its ends at 4 and 5. The end wall 5 has a depression or overflow part 6, for a purpose to be presently explained. The side 3 also forms a partition or side for the trough 1', having its other side at 3' and its ends at 4' and 5'. The partition 3' also forms a side for trough 1'', having its other side at 3'' and its ends at 4'' and 5''.

The bottoms of the troughs are double, as seen in Fig. 2, comprising a main bottom 7 and a false bottom 8. Between the bottoms 7 and 8 are partitions 9, alternated or so arranged that water or cooling medium circulated between the bottoms will take a zigzag course. The false bottom 8 when made of such substance as galvanized iron, copper, or tin will promptly respond to the effect of the circulating cooling medium. Lateral openings, as 10, suitably arranged allow the space between the bottoms to be readily cleaned or freed of impurities that may have lodged therein or against partitions 9.

A passage or cut, as 11, in partitions 3 and 3', respectively, leads from trough 1 to trough 1' and from the latter to trough 1''. These openings 11 can be closed, when desired, by suitable valves, slides, or doors, such as 12, adapted to slide or move along guides or ways 13 to opening and closing position.

The trough 1 has a partition 14, which terminates somewhat below the top of the trough or of the walls 2 and 3.

Supposing no assortment of yeast is required, the door 12 in partition 3 is closed. The fermented wort or beer is then allowed to flow with sufficient slowness into the space between end 4 and partition 14, and thence flowing over partition 14 finds its way in trough 1 along the cooled bottom 8, being suitably cooled in such flow toward trough end 5. The yeast settling along such bottom can at the proper time be drawn off or removed through outlet 15, normally closed, as by plug 16, while the wort or liquid flows through the cut or overflow 6 in end 5, to be caught in the receiver or compartment 17 at such overflow and led off through outflow 18 to any suitable tub or receptacle.

By cooling the liquid in its flow over bottom 8 it has been found that the yield and settling of the yeast are increased and accelerated.

If two different grades or kinds of yeast are required, the door 12 in partition 3 is opened, the door 12 in partition 3' being left closed. The stronger grade of yeast will then settle along the bottom of trough 1, while the liquid passing through the passage 11 in the opened partitions 3 and along the bottom of trough 1' will deposit the weaker grade of yeast along said last-named bottom. The liquid or beer overflowing from trough 1' through the overflow 6' in end 5' can be led off through outlet 18'. If the passage 11 in partition 3' is also opened, the liquid flowing through the troughs 1, 1', and 1'' will deposit the strongest grade of yeast in trough 1, the next strongest in trough 1', and the weakest grade in trough 1''. The yeast in troughs 1' and 1'' can be drawn off through outlets 15' and 15''. Liquid from trough 1'' can be allowed to pass through overflow 6'' to outlet 18'' or can be drawn off through opening 15'' if seen fit.

The cooling medium is circulated along partitions 9 or through the channel between the bottoms 7 and 8 in suitable well-known manner—as, for example, through inlet 19 and passing off at outlet 20. The bottoms 8 when slightly inclined will insure the liquid flowing off. By having an interposed partition, as 3, common to troughs 1 and 1' the construction is made simple and cheap.

The yeast obtained from the apparatus can be compressed or used in any suitable way.

What I claim as new, and desire to secure by Letters Patent, is—

1. An apparatus for separating and assorting yeast, comprising a series of troughs, and valves or slides for separating the troughs, said troughs having a channel for circulating a cooling medium in contact with the bottoms of the troughs, and having outlet or discharge openings, overflows at said outlets, and a receiver at said overflow and provided with an outflow substantially as described.

2. An apparatus for separating and assorting yeast comprising a series of troughs provided with double bottoms and alternating partitions in the space between the bottoms to enable a cooling medium to be circulating through such space, said troughs having interposed common valved partitions and overflows, and being provided with outlets and receivers at said overflows substantially as described.

In testimony whereof I have hereunto set my hand in the presence of two subscribing witnesses.

HENRY TAUSZKY.

Witnesses:
PHILIPP GULDMANN,
E. F. KASTENHUBER.